US012370937B2

(12) United States Patent
Lowe et al.

(10) Patent No.: US 12,370,937 B2
(45) Date of Patent: Jul. 29, 2025

(54) SYSTEM AND METHOD FOR AUTOMATED STORAGE AND DISTRIBUTION OF PACKAGES

(71) Applicant: Cargo Robotics, Inc., Palo Alto, CA (US)

(72) Inventors: Peter Lowe, San Jose, CA (US); Daniel Limon, Palo Alto, CA (US)

(73) Assignee: Cargo Robotics, Inc., Palo Alto, CA (US)

( * ) Notice: Subject to any disclaimer, the term of this patent is extended or adjusted under 35 U.S.C. 154(b) by 0 days.

(21) Appl. No.: 18/917,870

(22) Filed: Oct. 16, 2024

(65) Prior Publication Data

US 2025/0121761 A1    Apr. 17, 2025

Related U.S. Application Data

(60) Provisional application No. 63/590,507, filed on Oct. 16, 2023.

(51) Int. Cl.
    *G06F 7/00*      (2006.01)
    *B60P 1/54*      (2006.01)
    *B60P 3/00*      (2006.01)

(52) U.S. Cl.
    CPC ............. *B60P 1/5457* (2013.01); *B60P 3/007* (2013.01)

(58) Field of Classification Search
    CPC ........... B60P 1/5457; B60P 3/007; B60P 1/00; B60P 3/00
    USPC .......................................... 700/213–215, 218
    See application file for complete search history.

(56) References Cited

U.S. PATENT DOCUMENTS

| | | | |
|---|---|---|---|
| 9,950,862 B2 | 4/2018 | Kadaba et al. | |
| 2019/0143872 A1 | 5/2019 | Gil | |
| 2019/0297450 A1 | 9/2019 | Hwang et al. | |
| 2020/0156868 A1 | 5/2020 | Bidram et al. | |
| 2021/0253015 A1 | 8/2021 | Schwartz et al. | |
| 2021/0387808 A1 | 12/2021 | Kalouche | |
| 2022/0396192 A1 | 12/2022 | Paul et al. | |
| 2024/0391375 A1* | 11/2024 | Colucci | B60P 1/649 |

OTHER PUBLICATIONS

International Search Report Received in PCT/US2024/051650 dated Jan. 14, 2025.

* cited by examiner

*Primary Examiner* — Yolanda R Cumbess
(74) *Attorney, Agent, or Firm* — Run8 Patent Group, LLC; Peter Miller; Alexander Rodriguez

(57) ABSTRACT

A system including: a self-contained module configured to install within a cargo vehicle; and a controller. The self-contained module includes: a shelf assembly; and a robotic assembly. The shelf assembly includes: shelves configured to store packages; and a chute extending between the shelves and configured to locate proximal a driver cab of the cargo vehicle. The robotic assembly includes: an end effector configured to manipulate the packages; a robotic arm configured to manipulate the end effector across the shelves; and an elevator configured to maneuver the robotic arm between the shelves. The controller is configured to: identify a shelf occupied by a package associated with a delivery location; trigger the elevator to maneuver the robotic arm to the shelf; and trigger the robotic arm to withdraw the package, via the end effector, toward the chute prior to arrival of the cargo vehicle at the delivery location.

20 Claims, 8 Drawing Sheets

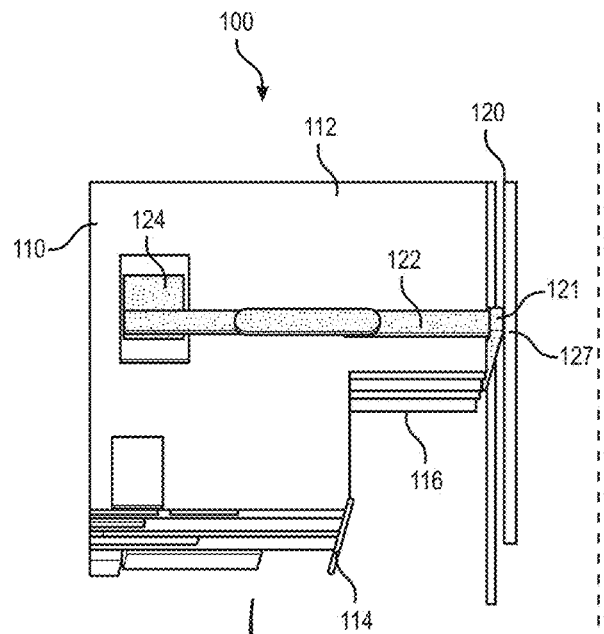
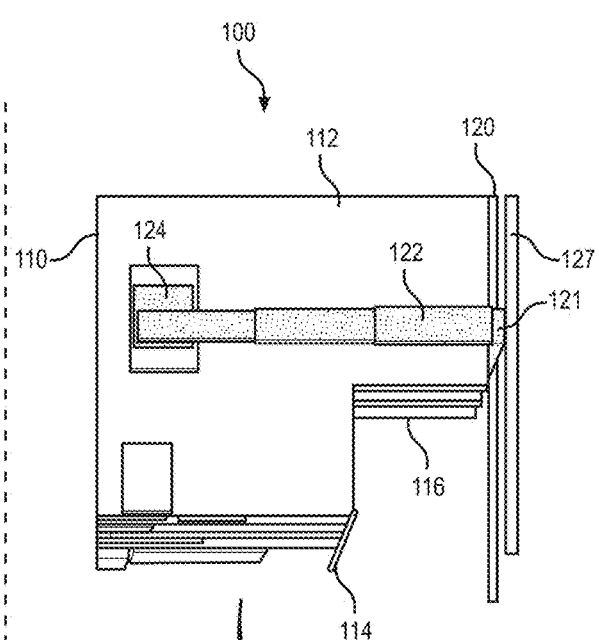
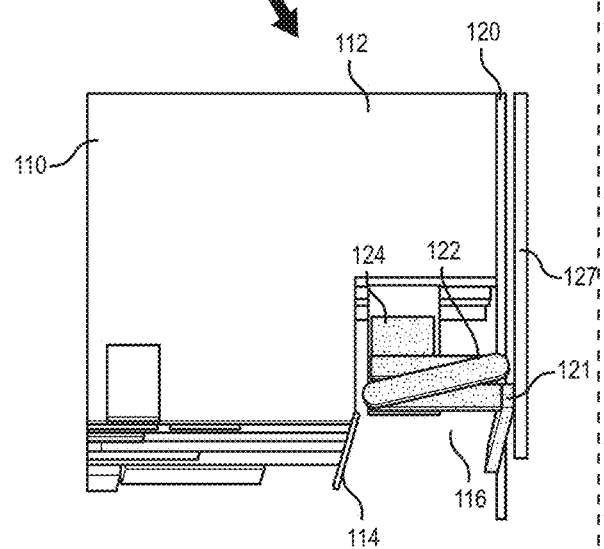
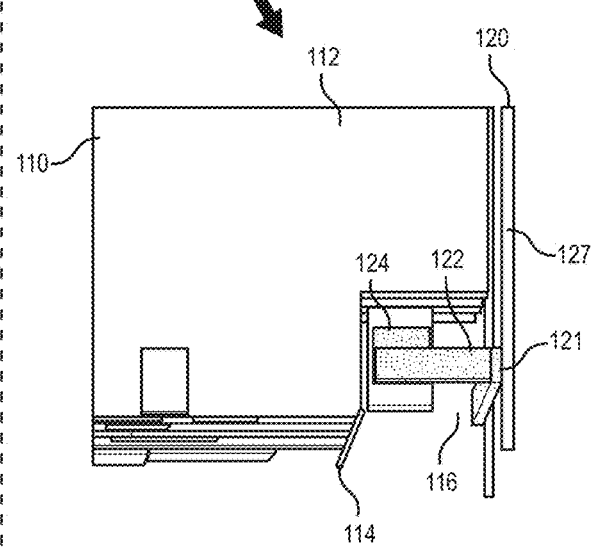
*FIGURE 5*      *FIGURE 6*

SYSTEM AND METHOD FOR AUTOMATED STORAGE AND DISTRIBUTION OF PACKAGES

CROSS-REFERENCE TO RELATED APPLICATIONS

This application claims the benefit of U.S. Provisional Application No. 63/590,507, filed on 16 Oct. 2023, which is hereby incorporated in its entirety by this reference.

TECHNICAL FIELD

This invention relates generally to the field of storage and distribution and more specifically to a new and useful automated storage and distribution system and method in the field of storage and distribution.

BRIEF DESCRIPTION OF THE FIGURES

FIG. 5 is a schematic representation of the system;
FIG. 6 is a schematic representation of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
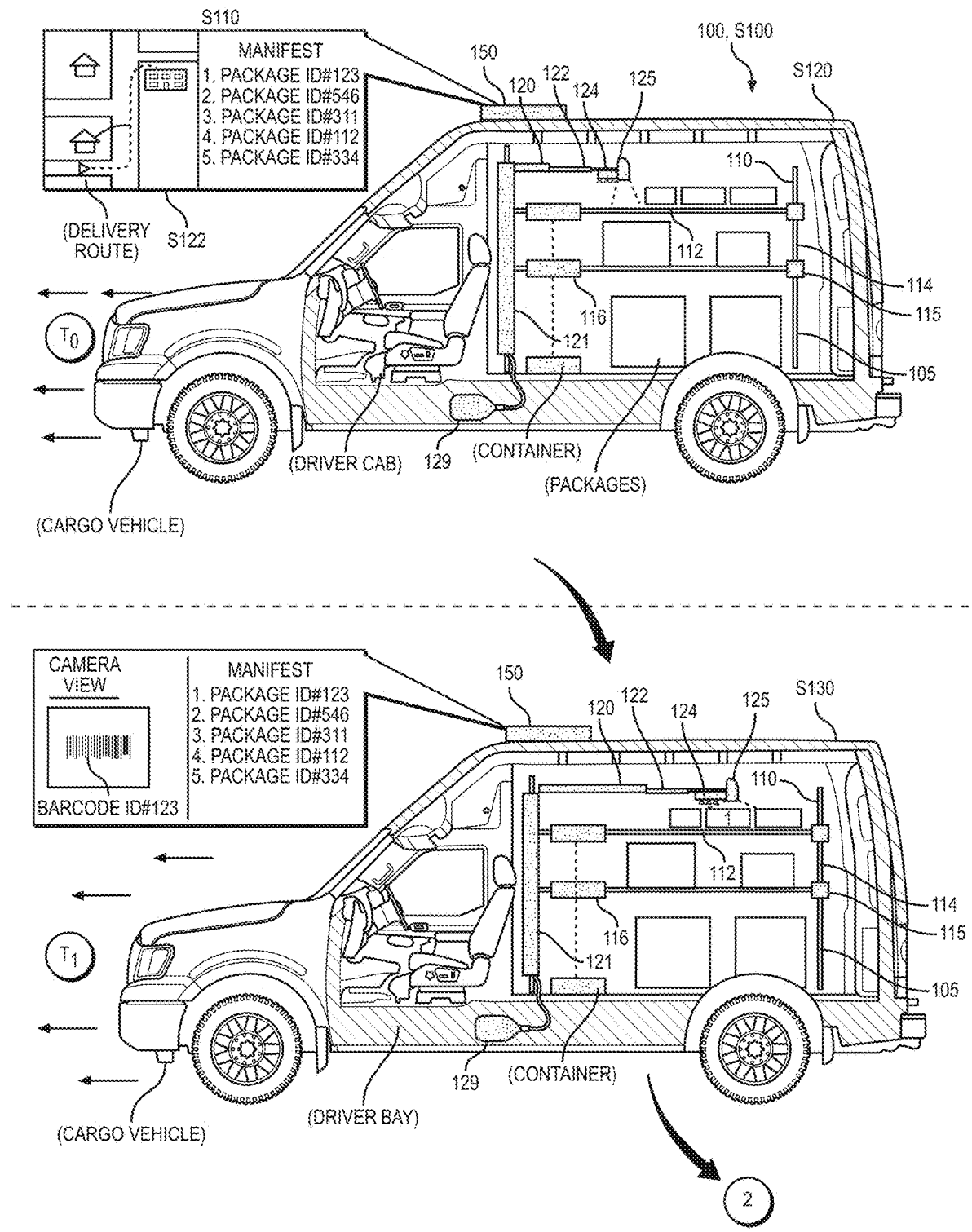
FIG. 1 is a flowchart representation of a method.
Figure 2:
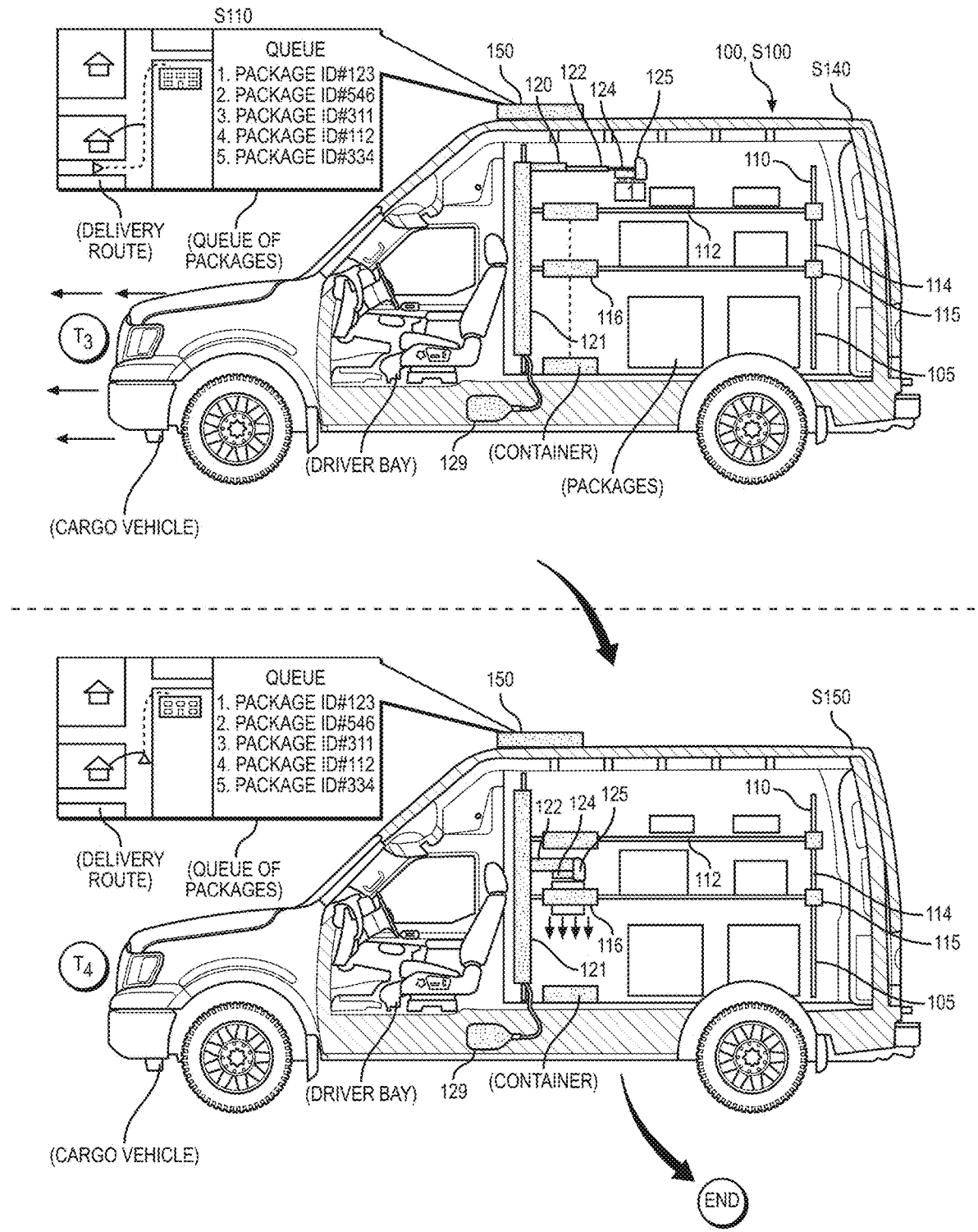
FIG. 2 is a flowchart representation of the method.

As shown in FIGS. 1 and 2, a system 100 includes: a self-contained storage and distribution module 105 configured to install within a cargo vehicle; and a controller 150.

The self-contained storage and distribution module 105 includes: a shelf assembly 110; and a robotic assembly 120.

The shelf assembly 110: includes a set of shelves 112 configured to store a set of packages; and a first chute 116 extending vertically through an opening of multiple shelves of the set of shelves 112. The first chute is located proximal a driver cab of the cargo vehicle.

The robotic assembly 120 includes: an end effector 124 configured to transiently retain packages, in the set of packages, stored on the set of shelves 112; a robotic arm 122 configured to manipulate the end effector 124 across the set of shelves 112 to transiently withdraw individual packages, in the set of packages, from the set of shelves 112 toward the primary chute; and an elevator 121 configured to maneuver the robotic arm 122 between the set of shelves 112.

The controller 150 is configured to access a manifest of destinations assigned to the set of packages. Additionally, during navigation of the cargo vehicle along a delivery route, the controller 150 is configured to: access a primary geospatial location of the cargo vehicle; predict a primary delivery location, in the delivery route, based on the primary geospatial location and the manifest of destinations; and identify a primary shelf, in the set of shelves 112, occupied by a primary package, in the set of packages, associated with the primary delivery location.

Furthermore, during navigation of the cargo vehicle along the delivery route, the controller 150 is configured to: trigger the elevator 121 to maneuver the robotic arm 122 to the primary shelf; trigger the robotic arm 122 to navigate the end effector 124 to the primary package on the primary shelf; trigger the end effector 124 to transiently retain the primary package; and trigger the robotic arm 122 to withdraw the primary package, via the end effector 124, toward the primary chute prior to arrival of the cargo vehicle at the primary delivery location.

1.1 Method

Figure 9:
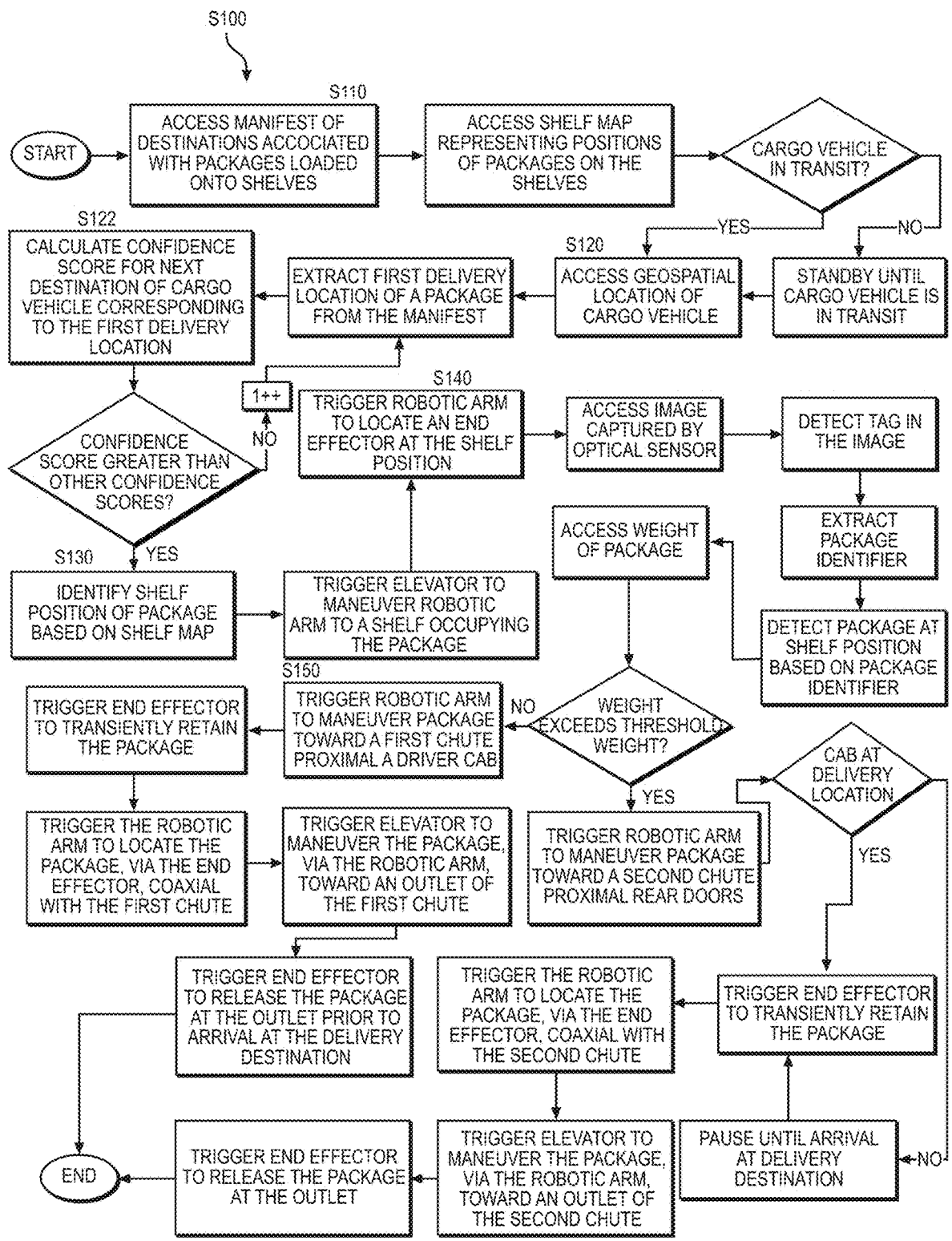
FIG. 9 is a flowchart representation of the method.

As shown in FIGS. 1, 2, and 9 Blocks of the method S100 include, at a self-contained storage and distribution module 105 configured to install within a cargo vehicle, accessing a manifest of destinations assigned to a set of packages, pre-loaded onto a set of shelves 112, for delivery along a delivery route of the cargo vehicle in Block S110.

Blocks of the method S100 also include, during navigation of the cargo vehicle along the delivery route: accessing a primary geospatial location of the cargo vehicle in Block S120; predicting a primary delivery location, in the delivery route, based on the primary geospatial location and the manifest of destinations in Block S122; and identifying a primary shelf, in the set of shelves 112, occupied by a primary package, in the set of packages, associated with the primary delivery location in Block S130.

Blocks of the method S100 further include, during navigation of the cargo vehicle along the delivery route, in Block S140: triggering an elevator 121 to maneuver a robotic arm 122 to the primary shelf; triggering the robotic arm 122 to navigate an end effector 124, coupled to a distal end of the robotic arm 122, to the primary package on the primary shelf; and triggering the end effector 124 to transiently retain the primary package.

Blocks of the method S100 also include, during navigation of the cargo vehicle along the delivery route, triggering the robotic arm 122 to withdraw the primary package, via the end effector 124, toward a primary chute-configured to locate proximal a driver cab of the cargo vehicle-prior to arrival of the cargo vehicle at the primary delivery location in Block S150.

2. Applications

Generally, as shown in FIGS. 1 and 2, the system 100 functions as a self-contained storage and distribution module 105 pre-loaded with packages and configured to: transiently install within a cargo vehicle; and distribute these packages during transit of the cargo vehicle along a delivery route. More specifically, the system 100 includes: a shelf assembly 110 configured to store pre-loaded packages across a set of shelves 112 based on known package characteristics (e.g., dimensions, weight, package materials) to maximize available package density within the self-contained module 105; and a controller 150 configured to trigger a robotic assembly 120 to withdraw a package from the set of shelves 112 toward a chute 116 within the cargo vehicle (e.g., arranged at the driver cabin, arranged at the rear doors, arranged at side doors). Thus, prior to arrival of the cargo vehicle at a destination or upon detecting arrival of the cargo vehicle at a destination of a delivery route, the system 100 can autonomously dispense packages associated with the destination at an outlet (or "retrieval area") from the chute 116, thereby eliminating the need for an operator of the cargo vehicle to manually retrieve packages from the cargo vehicle. In another example, the system 100 can: detect removal of packages—associated with a current destination of the delivery route—from the outlet of the chute 116; and, in response to detecting removal of the packages, autonomously dispense packages associated with a next destination of the delivery route at the outlet of the chute 116.

In one example, the shelf assembly 110 includes: a set of adjustable vertical supports 114 coupled to an actuator 115 configured to raise and lower individual shelves, in the set of shelves 112, to modify a height of partitions within the self-contained module 105 in order to accommodate for different sizes, weights, content risk (e.g., hazmat) of packages; and a set of apertures formed into each shelf, in the set of shelves 112, to define the chute 116 within the cargo vehicle (e.g., driver cab chute, rear door chute). The robotic assembly 120 can include: a robotic arm 122 (e.g., cantilever robotic arm 122) coupled to an elevator 121 (e.g., vertical linear conveyor) configured to translate the robotic arm 122 along a height of the set of shelves 112; and an end effector 124 (e.g., gripping tool, suction pads 125) arranged at a distal end of the robotic arm 122 and configured to transiently retain (e.g., grip) packages arranged on the set of shelves 112.

Additionally, the system 100 can include a suite of sensors such as: an optical sensor 126 (e.g., thermal camera, depth camera, color camera, X-ray camera, LiDAR camera) coupled to the robotic arm 122 and configured to capture image data (e.g., pixel arrays, three-dimensional point clouds) of packages arranged across the set of shelves 112; and a weighing device 128 (e.g., load cell) coupled to the robotic arm 122 and configured to capture (e.g., via load values) weight characteristics of packages carried by the end effector 124. The system 100 can then leverage this data from the suite of sensors to: identify packages arranged on the set of shelves 112; and validate that the appropriate package was retrieved from the set of shelves 112.

The system 100 can then access a manifest of destinations-such as from a remote computer system 100 prior to transit of the cargo vehicle or generated by the system 100 during loading of the cargo vehicle-associated with loaded packages within the cargo vehicle for a planned delivery route. Additionally, during transit of the cargo vehicle along the delivery route, the system 100 can: access a geospatial location (e.g., from a global positioning module 105) of the cargo vehicle; implement route planning techniques (e.g., triangulation, path planning, arrival estimation) to calculate a confidence score representing that a next delivery location of the cargo vehicle corresponds to an assigned delivery location of a primary package based on the manifest of destinations and the geospatial location; and identify a shelf position (e.g., X, Y, Z position) of a primary package arranged on the set of shelves 112.

The system 100 can then, based on the confidence score of the primary package exceeding confidence scores of the set of packages, trigger the robotic arm 122 to 1) maneuver the end effector 124 to the shelf position to transiently retain the primary package to the end effector and 2) maneuver the primary package, via the end effector 124, to a new location proximal the chute 116 within the cargo vehicle. The system 100 can then, upon detecting arrival of the cargo vehicle at the primary destination—via the robotic arm 122—navigate the primary package coaxial with the chute 116 at the cargo vehicle and dispense the primary package into the chute 116.

Therefore, rather than grouping packages across the set of shelves 112 based on delivery destinations of these packages (which is commonly done to make packages easier for drivers to find), the system 100 can: store these packages across the set of shelves 112 based on known weights and sizes of the packages to maximize a density of packages that are loaded onto the set of shelves 112; and, during transit to the delivery destinations, autonomously withdraw these packages according to predicted destination arrival of the cargo vehicle. Accordingly, the system 100 can: increase a quantity of packages that can be loaded into a cargo vehicle and assigned for delivery along a delivery route; reduce package loading errors and package retrieval errors of packages assigned for delivery; reduce likelihood of injury (e.g., fall injuries, vehicle exiting injuries) for an operator by eliminating the need for handling packages within the cargo vehicle; and decrease duration of time spent by an operator (e.g., delivery driver) sorting and distributing packages loaded into the cargo vehicle.

3. Self-Contained Storage and Distribution Module

Generally, the system 100 includes a self-contained storage and manipulation module 105 (hereinafter "self-contained module 105"): including a shelf assembly 110 and a robotic assembly 120; and configured to install within a cargo vehicle, such as in preparation for a delivery route assigned to the cargo vehicle.

Figure 8:
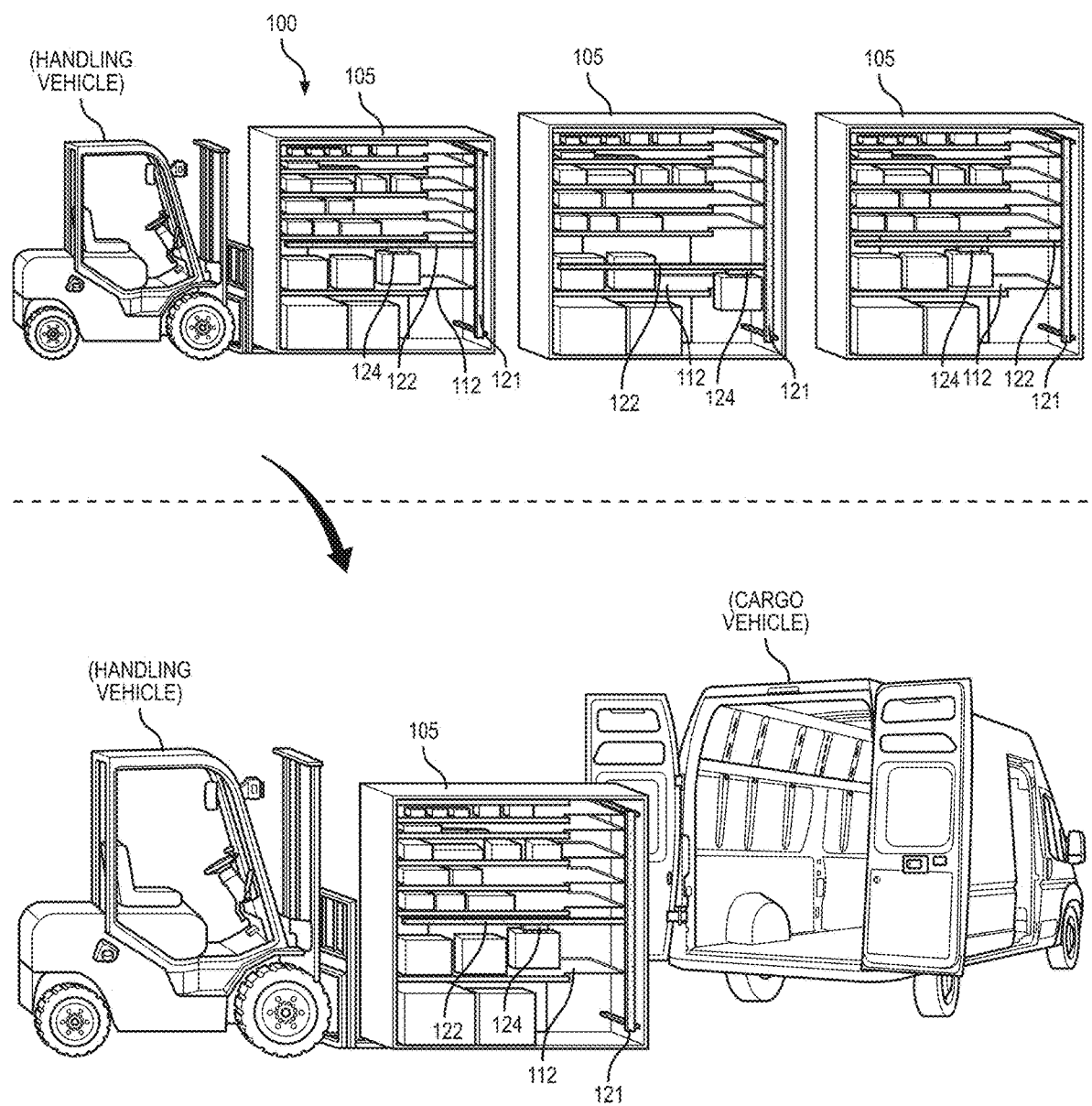
FIG. 8 is a schematic representation of the system.

In one implementation, as shown in FIGS. 1,2, and 8, the self-contained module 105 is configured to locate within a facility (e.g., package facility) to autonomously and/or manually store and distribute packages-such as during a loading cycle-associated with destinations of a delivery route assigned to a cargo vehicle within the facility. Following loading of these packages, the self-contained module 105 can then be configured to install within the cargo vehicle, such as by: via a loading vehicle (e.g., skid steer loader), loading the self-contained module 105 within the cargo vehicle; and transiently coupling the self-contained module 105 within the cargo vehicle via fasteners and clamps. In this implementation, following completion of the delivery route by the cargo vehicle, the self-contained module 105 can then be removed from the cargo vehicle and arranged within the facility for preparation of a secondary delivery route assigned to the cargo vehicle.

In another implementation, the self-contained module 105 can be permanently installed, such as via welding, within the cargo vehicle. In this implementation, during a loading cycle, the system 100 can autonomously store and distribute received packages associated with a delivery route assigned to the cargo vehicle within the facility. Following completion of the delivery route and upon return of the cargo vehicle at the facility, the self-contained module 105 can receive additional packages for a secondary delivery route assigned to the cargo vehicle.

In yet another implementation, at the package facility, the self-contained module 105 can autonomously unload received packages (e.g., return packages) received during a previous delivery route, such as by unloading these packages onto: a container (e.g., a tote bag) arranged proximal a chute 116 of the self-contained module 105; and/or an autonomous cart (e.g., pallet vehicle) arranged proximal the chute 116 of the self-contained module 105.

Therefore, the system 100 can then repeat this process across a corpus of self-contained modules 105 arranged within a package facility for a fleet of cargo vehicles that are assigned delivery routes for delivering packages.

Although the aforementioned implementations describe a single self-contained module 105 configured to install within a cargo vehicle, other variations of the system 100 can include a set of self-contained modules 105 installed within other variations of transportation vehicles (e.g., a truck bed, storage containers).

3.1 Shelf Assembly

In one implementation, as shown in FIGS. 3, 4, 5, and 6 the system 100 includes a shelf assembly 110 including: a set of shelves 112 (e.g., rectilinear shelves) configured to receive a set of packages (e.g., at a loading dock within a facility); and a chute 116 extending vertically through an opening (e.g., cutouts, apertures) of multiple shelves of the set of shelves 112. The first chute is located within the cargo vehicle (e.g., located proximal a driver cab, located proximal rear doors). In this implementation, the shelf assembly 110 can include a set of vertical supports 114 (e.g., adjustable vertical support, vertical wall) configured to install within the cargo vehicle and defining a frame that supports the set of shelves 112 within the cargo vehicle. Accordingly, each shelf, in the set of shelves 112 can define a rectilinear geometry supported at corners and/or edges (i.e., via the vertical supports 114) within the cargo vehicle.

In one example, the shelf assembly 110 includes: a primary set of apertures formed into a primary corner of the set of shelves 112 to define a primary chute 116 (or "pass-through channel") arranged proximal the driver cabin of the cargo vehicle; and a secondary set of apertures formed into a secondary corner of the set of shelves 112 to define a secondary chute 117 arranged proximal the rear doors of the cargo vehicle. In this example, the primary set of apertures can define a primary set of chute dimensions (e.g., 1 feet×1.5 feet) suitable for dispensing of small (e.g., less than dimensions of 1 feet by 1.5 feet) and lightweight (e.g., less than 10 pounds) packages proximal the driver cabin. Additionally, the secondary set of apertures can define a secondary set of chute dimensions (e.g., 2 feet by 3 feet) suitable for dispensing of larger (e.g., dimensions greater than 2 feet by 3 feet) and heavier (e.g., greater than 10 pounds) packages proximal the rear side of the cargo vehicle opposite from the driver cabin of the cargo vehicle. Other variations of this implementation can include the chute 116 arranged vertically, horizontally, and/or angularly across the set of shelves 112.

Therefore, the system 100 can: based on known size and weight of a package arranged on the set of shelves 112, select a chute 116 for dispensing the package; and trigger the robotic arm 122 to withdraw the package toward the chute 116 prior to arrival of the cargo vehicle at a delivery location.

Although the aforementioned implementation describes a shelf assembly 110 configured to be installed within a cargo vehicle, other variations of the system 100 can include a standalone self-contained shelf assembly 110: permanently installed within the cargo vehicle; and/or installed at a loading dock of a facility.

3.1.1 Adjustable Vertical Supports

Figure 3:
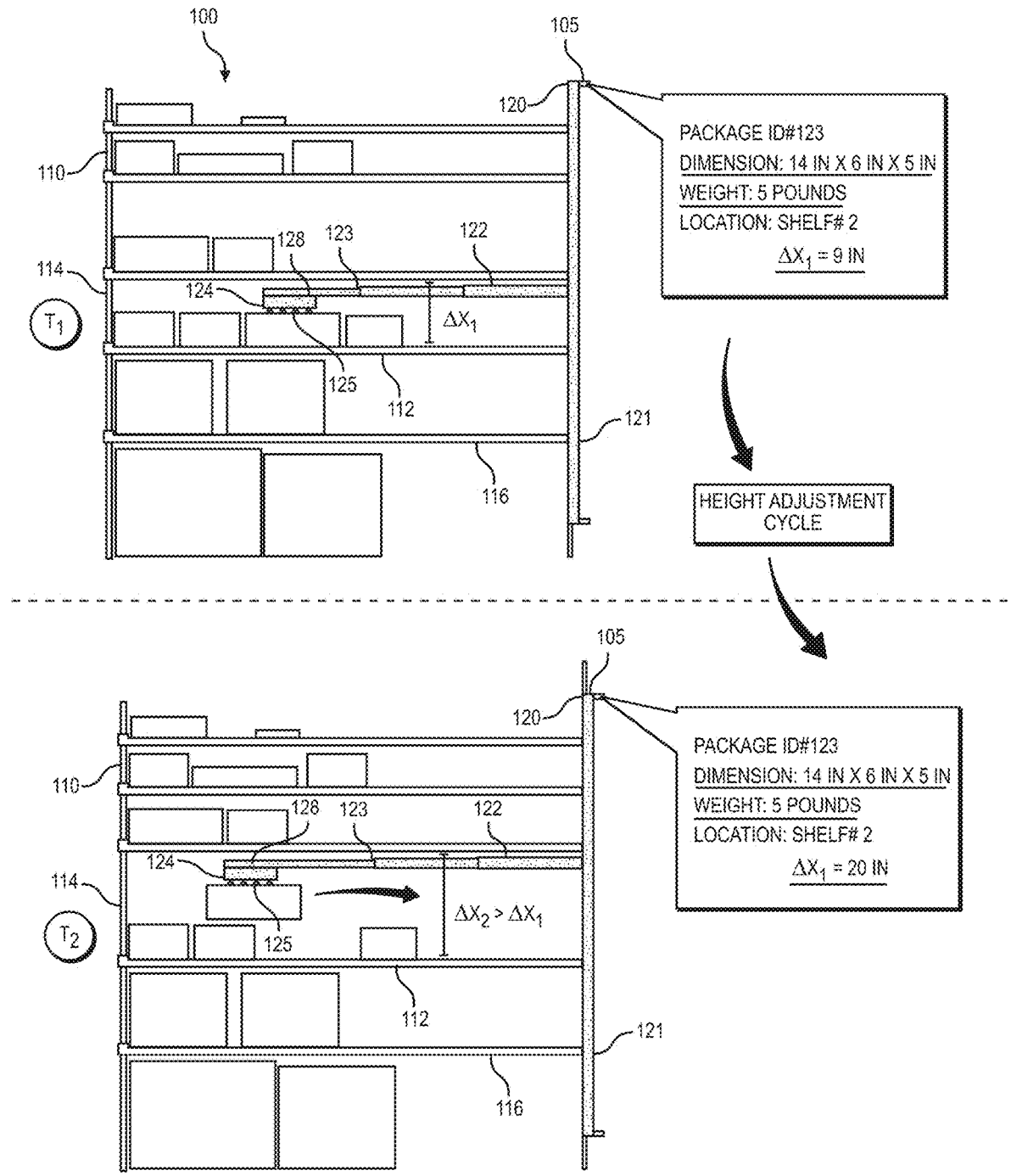
FIG. 3 is a schematic representation of a system.
Figure 4:
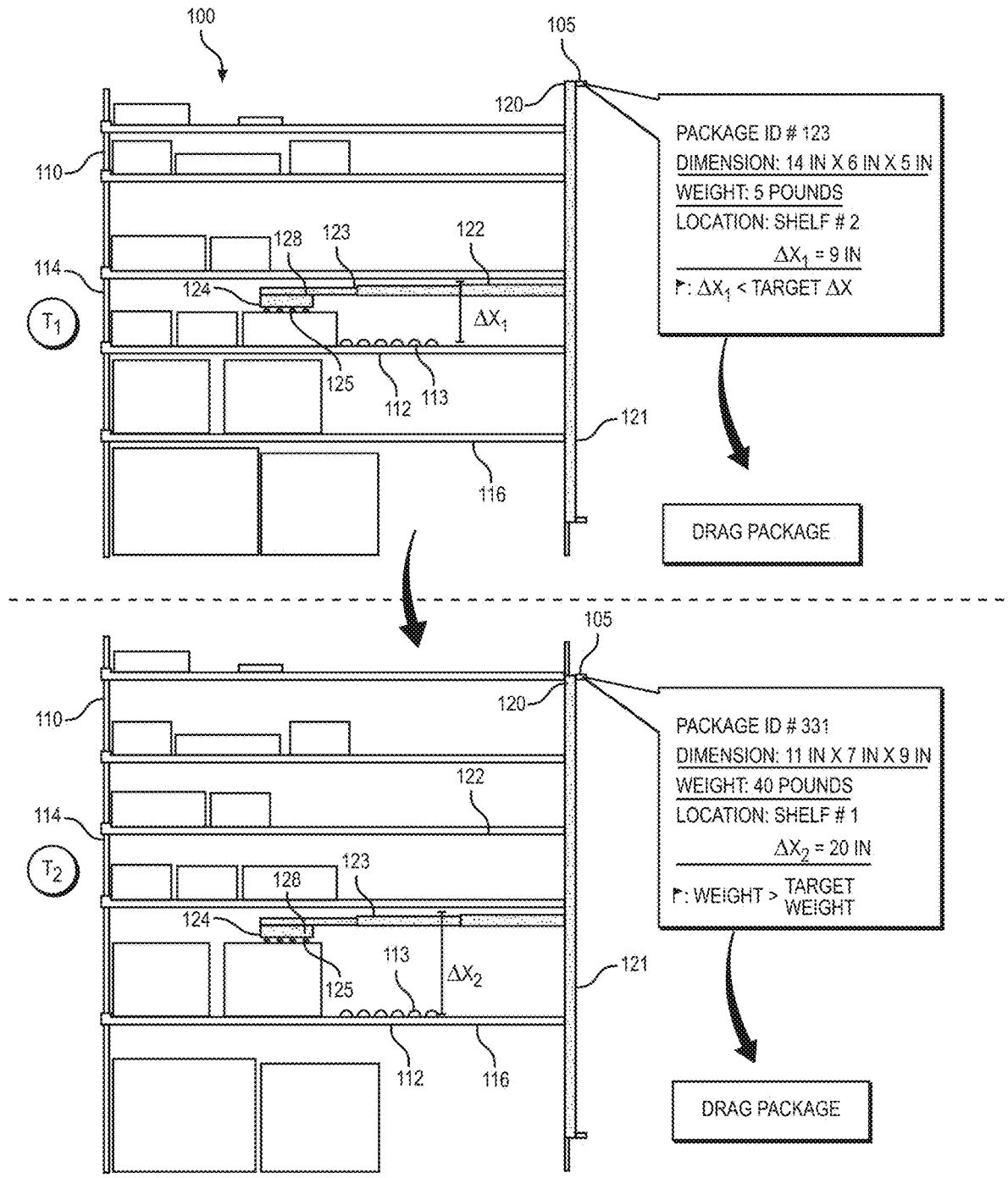
FIG. 4 is a schematic representation of the system.

In one implementation, as shown in FIGS. 2 and 3, the shelf assembly 110 includes: a set of adjustable vertical supports 114 arranged at corners and/or edges of the set of shelves 112; and an actuator 115 coupled to the set of adjustable vertical supports 114 configured to adjust heights between the shelves across the set of shelves 112.

In one example, the system 100 can: set a primary height (e.g., four feet) between a floor shelf and a primary shelf arranged above the floor shelf; and set a secondary height (e.g., 1.5 feet) between the primary shelf and a secondary shelf arranged above the primary shelf. In this example, the primary partition between the floor shelf and the secondary shelf can be designated for large (e.g., exceeding 10 pounds, exceeding dimensions of 2 feet×3 feet) and/or high-risk packages (e.g., hazmat, flammable, combustible packages). Alternatively, the secondary partition between the primary shelf and the secondary shelf can be designated for smaller (e.g., less than 10 pounds) and low-risk packages (e.g., non-hazmat, non-flammable, non-combustible packages). Accordingly, prior to retrieval of a package arranged at the primary shelf, the system 100 can then trigger the actuator 115 to increase a clearance of the primary partition between the primary shelf and the secondary shelf such as in order to accommodate for lifting and withdrawing of a package arranged on the primary shelf by the robotic assembly 120. Thus, the system 100 can increase and/or decrease clearance across the set of shelves 112 to: accommodate for lifting of packages stored on the set of shelves 112; and/or accommodate additional packages, which may be loaded onto the cargo vehicle and/or distributed from additional shelves of the shelf assembly 110.

Therefore, the system 100 can selectively increase and/or decrease clearance between shelves, in the set of shelves 112, to accommodate for greater density of package distribution across the shelf assembly 110.

3.1.2 Variation: Non-Cartesian Shelf Assembly

In one variation, the system 100 can include a set of shelves 112 defining a non-cartesian (e.g., circular, demilune) geometry. Similarly, as described above, the system 100 can include: a chute 116 (or a set of chutes) for dispensing packages contained across the set of shelves 112; and a set of adjustable vertical supports 114 configured to raise and lower partitions between shelves, in the set of shelves 112, to accommodate for greater density of package distribution.

It should be understood that other variations of the shelf assembly 110 can include non-planar (e.g., curved surfaces, spiral surfaces, inclined sections) geometries for the set of shelves 112.

3.2 Robotic Assembly

In one implementation, as shown in FIGS. 1, 2, 5 and 6, the robotic assembly 120 includes: a robotic arm 122 (e.g., telescopic robotic arm 122, cantilever robotic arm 122, foldable robotic arm 122); an end effector 124 (e.g., a vacuum gripper, vacuum area gripper, foam vacuum gripper, or soft robotic gripper) coupled to a distal end of the end effector 124; a set of linear actuators 127 arranged about a periphery of the shelf assembly 110, such as across a length, a width, and/or a height of the shelf assembly 110, configured to translate the robotic arm 122—and therefore the end effector 124—about the shelf assembly 110; a vacuum pump or vacuum generator (e.g., venturi vacuum generator) coupled to the end effector 124 and configured to supply a suction force to the end effector 124 (e.g., suction pads 125); a controller 150 configured to execute closed loop controls to manipulate the robotic arm 122, the end effector 124, the set of linear conveyors, and the vacuum pump; and a power supply (12 volts-24 volts rechargeable battery) configured to supply power to the robotic assembly 120. The system 100 can further include a suite of sensors, such as: an optical sensor 126 (e.g., color camera, depth camera, infrared camera, X-ray camera, LiDAR camera) coupled to the distal end of the end effector 124 or coupled externally to the shelf assembly 110, and configured to capture image data (or "scan data"), such as pixel arrays and/or three-dimensional point clouds, of packages loaded onto the set of shelves 112; a load cell 128 (e.g., weight cell) coupled to the end effector 124 and configured to output signals representative of a load carried by the end effector 124; a global positioning module 105 (e.g., GPS) configured to retrieve real-time positing data of the cargo vehicle during transit of the delivery route; and a wireless communication module 105 (e.g., satellite communication) configured to transfer real-time data (e.g., package identifiers, queues of packages, shelf maps, rate of delivery) to a remote computer system 100.

Although the aforementioned implementation describes a separate external power supply for the robotic assembly 120, other variations of the system 100 can include a robotic assembly 120 configured to draw power from a built-in power supply (e.g., power from batteries in electric vehicles, power from alternators coupled to a combustion engine) of the cargo vehicle. Additionally, other variations of robotic manipulators (e.g., cartesian manipulators, polar manipulators, gantries, snake robots) can be implemented into the system 100.

3.2.1 Cantilever Robotic Arm

In one implementation, as shown in FIGS. 5 and 6, the robotic assembly 120 can include a robotic arm cantilevered (e.g., foldable robotic arm 122, telescoping robotic arm 122) on the elevator 121. In this implementation, the robotic arm 122 can define a set of arm segments configured to extend or retract the end effector 124 along a length and/or width of the shelf assembly 110. In one example, the robotic assembly 120 can include: a longitudinal actuator 127 extending across a length about a periphery of the shelf assembly 110; and an elevator 121 extending vertically across the set of shelves 112 shelf assembly 110. In this implementation, the cantilever robotic arm 122 is coupled to the longitudinal actuator 127 and the elevator 121. The system 100 can then: trigger the set of arm segments of the cantilever robotic arm 122 to extend the end effector 124 across a width of the shelf assembly 110; and trigger the end effector 124 to transiently retain a package arranged on a shelf.

In this example, vertical translation of the robotic arm 122 can be blocked by the stacked vertical shelves of the shelf assembly 110. Accordingly, prior to the system 100 vertically translating the robotic arm 122 to a target height, the system 100 can: navigate the cantilever robotic arm 122 coaxial with the chute 116 of the shelf assembly 110; and, following location of the cantilever robotic arm 122 coaxial the chute 116, navigate the cantilever robotic arm 122 at a target height (or "target shelf height") within the chute 116.

Therefore, the system 100 can repeatably and accurately position the robotic arm 122 across all locations of the set of shelves 112: in preparation for maneuvering a package across a shelf and/or across multiple shelves; and/or during a scan cycle to collect image data (i.e., via the optical sensor 126) of packages arranged across the set of shelves 112.

3.2.2 Vacuum Pump

In one implementation, as shown in FIGS. 1 and 2, the system includes: the end effector 124 including a set of suction pads 125 (e.g., vacuum area pads, foam vacuum pads); and a vacuum pump 129 configured to generate negative pressure at the set of suction pads 125 to transiently retain a package to the end effector 124. In this implementation, the system can: trigger the elevator 121 to maneuver the robotic arm 122 to a shelf in the set of shelves 112; trigger the robotic arm 122 to maneuver the end effector 124 to the package arranged on the shelf; and trigger the vacuum pump 129 to draw a vacuum at the set of suction pads 125 to transiently retain the package to the end effector 124.

Although the aforementioned implementation describes a vacuum pump 129 and suction pads 125 to transiently retain the package to the end effector 124, other variations of the system can include variations of end effectors 124 (e.g., claw end effector) to transiently retain the package to the end effector 124.

3.2.3 Multiple Robotic Arms

Figure 7:
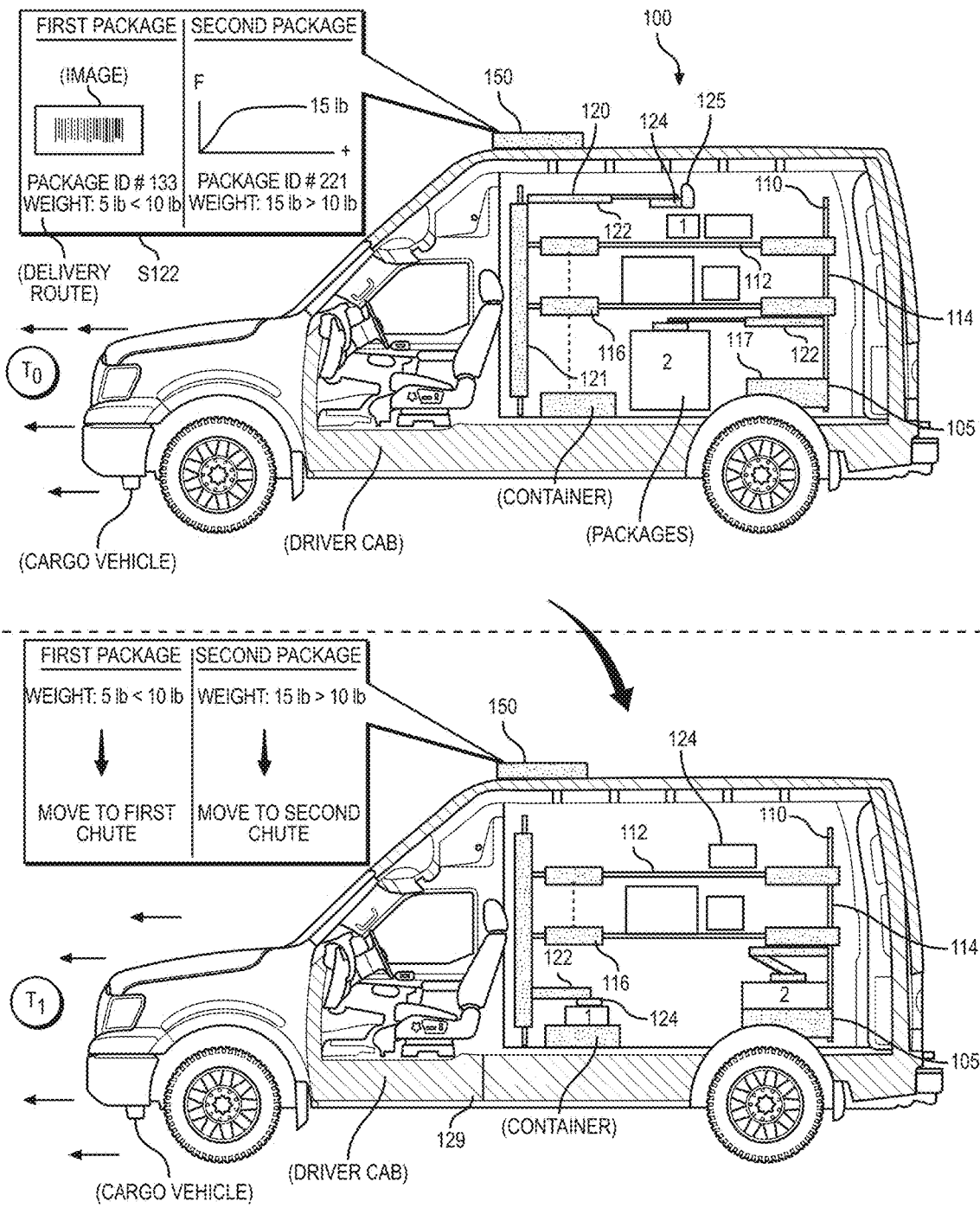
FIG. 7 is a schematic representation of the system.

In one implementation, as shown in FIG. 7, the system 100 can include a set of robotic arms 122 (e.g., more than a single robotic arm). In one example, the system 100 can include: a primary set of linear actuators 127, as described above, arranged at a primary side of the shelf assembly 110; and a primary robotic arm 122 (e.g., cantilever robotic arm 122) coupled to the primary set of linear actuators 127. Additionally, the system 100 can include: a secondary set of linear actuators 127 arranged at a secondary side, opposite the primary side, of the shelf assembly 110; and a secondary robotic arm 122 (e.g., cantilever robotic arm 122) coupled to the secondary set of linear actuators 127. Therefore, the system 100 can: trigger the end effector 124 to couple a set of packages arranged on the set of shelves 112; and consecutively and/or concurrently navigate these sets of packages across different locations on the set of shelves 112.

Although the aforementioned implementation describes variations of the robotic assembly 120 including a single or multiple robotic arms 122, it should be understood that other variations of the system 100 can eliminate the robotic arm 122 and include an end effector 124 coupled to a set of linear actuators 127 configured to translate the end effector 124 along a length, width, and/or height of the shelf assembly 110. Other implementations can include combinations of end effectors 124 coupled to robotic arms 122 and a set of linear actuators 127.

3.2.4 Chute+Loading Environment

In one implementation, as shown in FIG. 7, the system 100 can include a container (e.g., a tote bag, bin) arranged at a distal end of the chute 116 (e.g., driver cab chute, rear chute) and configured to receive the dispensed packages from the robotic assembly 120 and/or supply packages for loading onto the set of shelves 112.

In another implementation, the system 100 can include a cart (e.g., autonomous cart, mobile container) arranged at the distal end of the chute 116 (e.g., driver cab chute, rear chute) and configured to receive the dispensed packages from the robotic arm 122 and/or supply packages for loading onto the set of shelves 112.

In yet another implementation, the system 100 can include a conveyor actuator (e.g., conveyor belt) configured to receive the dispensed packages from the robotic arm 122 and/or supply packages for loading onto the set of shelves 112.

3.2.5 Variation: Non-Cartesian Robotic Assembly

Similarly, as described above for the shelf assembly 110, the system 100 can include a non-cartesian robotic assembly 120 cooperating with a non-cartesian shelf assembly 110 to define a non-cartesian self-contained module 105. In this implementation, the system 100 can include: a robotic arm 122, as described above; and a non-linear conveyor (e.g., demi-lune conveyors) configured to rotate the robotic arm 122 about a periphery of the non-cartesian shelf assembly 110. The system 100 can then similarly implement steps described above and below to distribute packages across the set of shelves 112 via the robotic assembly 120.

3.2.6 Non-Compliant Packages

In one implementation, a package assigned to be loaded onto the shelf assembly 110 can exceed a deviation from a weight threshold (e.g., greater than 40 pounds, less than 2 pounds) and/or exceed a deviation from a dimension threshold (e.g., greater than 3 feet by 3 feet, less than 0.5 feet by 0.5 feet)—such as packages of furniture, car parts, jewelry etc.—for compliance with the end effector (e.g., vacuum gripper). Accordingly, the system 100 can then designate loading of the packages exceeding these thresholds to a shelf manually accessible to the operator within the cargo vehicle. Thus, rather than the system 100 autonomously retrieving these packages, the operator can manually retrieve these packages upon arrival at a corresponding destination of the delivery route.

4. Package Manifest

Blocks of the method S100 recite, at a self-contained storage and distribution module 105 configured to install within a cargo vehicle: accessing a manifest of destinations assigned to a set of packages, pre-loaded onto a set of shelves 112, for delivery along a delivery route of the cargo vehicle in Block S110.

Generally, the system 100 can access a manifest of destinations associated with packages loaded onto the cargo vehicle and associated with an assigned delivery route of the cargo vehicle. More specifically, the system 100 can: access a previously generated manifest of destinations, such as generated at a remote computer system 100 based on the known delivery route and known addresses of the packages; and/or generate a manifest of destinations, such as during a loading cycle of packages onto the set of shelves 112 of the self-contained module 105.

In one implementation, the manifest of destination contains, for each package—in the set of packages—arranged on the set of shelves 112: an assigned delivery location (e.g., address, coordinate locations) of the package; a package identifier (e.g., unique ID) associated with the package; a weight of the package; and visual characteristics (e.g., dimensions, color, indicium) of the package. In one example, a remote computer system 100 can: generate the manifest of destinations associated with packages for delivery along a delivery route assigned to a cargo vehicle; and transmit this manifest to the self-contained module 105 prior to navigation of the cargo vehicle along the delivery route. In another example, during loading of a package onto the self-contained module 105, the system 100 can generate the manifest based on known delivery locations, package identifiers, weight, and visual characteristics of the packages loaded onto the set of shelves 112.

Therefore, the system 100 can: access a manifest associated with packages loaded onto the self-contained module 105; and identify packages, in the manifest of destinations, assigned for delivery along a delivery route of the cargo vehicle.

5. Predicting Delivery Location

Blocks of the Method S100 further recite, during navigation of the cargo vehicle along the delivery route: accessing a first geospatial location of the cargo vehicle in Block S120; predicting a first delivery location, in the delivery route, based on the first geospatial location and the manifest of destinations in Block S122.

Generally, during navigation of the cargo vehicle along the delivery route, the system 100 can: access a current geospatial location of the cargo vehicle, such as from an onboard global positioning module of the cargo vehicle; and implement route planning techniques (e.g., triangulation, path planning, arrival estimation) to predict a next delivery destination of the cargo vehicle based on the manifest of destinations. More specifically the system 100 can: retrieve a delivery location for a package arranged on the set of shelves 112 from the manifest of destinations; calculate a confidence score (e.g., 80%, 15%) representing that a next destination of the cargo vehicle along the delivery route corresponds to the delivery location of the package; and in response to the confidence score exceeding a threshold confidence score (e.g., 80%), trigger the robotic arm 122 to maneuver to the end effector 124 to the package to transiently retain the package prior to arrival of the cargo vehicle to the next destination. Accordingly, during periods of navigation of the cargo vehicle along the delivery route, the system 100 can repeat these steps for each package arranged on the set of shelves 112 112.

5.1 Predicting Delivery Location

In one implementation, during navigation of the cargo vehicle along the delivery route, the system 100 can: access a next delivery location of the cargo vehicle from the delivery route assigned to the cargo vehicle; and identify a primary package arranged on the set of shelves 112 corresponding to the next delivery location of the cargo vehicle. Accordingly, the system 100 can then: identify a shelf position on the set of shelves 112 corresponding to the primary package; and trigger the robotic arm 122 to withdraw the primary package, via the end effector 124, toward the chute 116.

During navigation of the cargo vehicle along the delivery route, environmental conditions (e.g., traffic, accidents, road repair) can result in deviation of the delivery route by the cargo vehicle. In this implementation, during navigation of the cargo vehicle along the delivery route, the system 100 can: access a geospatial location of the cargo vehicle; and predict a next delivery location of the cargo vehicle based on the geospatial location and the manifest of destinations. For example, the system 100 can: identify a primary package on a shelf corresponding to a delivery location specified in the manifest of destinations; and according to proximity of the cargo vehicle to the delivery location of the primary package specified in the manifest of destinations, predict the delivery location as the next destination of the cargo vehicle. The system 100 can then: identify a shelf position on the set of shelves 112 corresponding to the primary package; and trigger the robotic arm 122 to withdraw the primary package, via the end effector 124, toward the chute 116.

Accordingly, during periods of navigation of the cargo vehicle along the delivery route, the system 100 can repeat this process for each package arranged on the set of shelves 112 in order to distribute these packages proximal the chute 116 prior to arrival of the cargo vehicle to a next delivery location.

5.2 Confidence Scores

In one implementation, the system 100 can: extract a primary delivery location (e.g., street address) of a primary package arranged on the set of shelves 112; based on the geospatial location of the cargo vehicle and the primary delivery location, calculate a confidence score (e.g., 85%) representing a degree of confidence the next delivery location of the cargo vehicle corresponds to the primary delivery location of the primary package; and, in response to the confidence score exceeding (e.g., greater than 85%) confidence scores of packages arranged on the set of shelves 112, trigger the robotic arm 122 to withdraw the primary package, via the end effector 124, towards the chute 116 prior to arrival of the cargo vehicle to the next deliver location. In one example, prior to arrival of the cargo vehicle to the next delivery location, the system 100 can trigger the robotic arm 122 to locate the primary package at a primary shelf position on the set of shelves 112 inversely proportional to the confidence score. In one example, the system can: identify packages associated with a delivery location corresponding to an apartment building; and, implement the steps described above to organize the packages across the set of shelves according to door number and/or floor number of the delivery location.

The system 100 can thus, repeat these steps for each package arranged on the set of shelves 112 to locate packages withdraw packages corresponding to a next delivery location of the cargo vehicle towards the chute 116.

5.3 Operator Confirmation

In one implementation, the system can: as described above, predict a set of delivery locations, along the delivery route, based on the geospatial location of the cargo vehicle; generate a prompt requesting an operator—driving the cargo vehicle—to confirm one or more delivery locations in the predicted set of delivery locations; and serve the prompt to the operator, such as via an integrated display of the cargo vehicle and/or at an external device (e.g., tablet) associated with the operator. The system can then: receive confirmation or correction from the operator of one or more delivery locations, along the delivery route, as corresponding to a next delivery stop; and autonomously retrieve packages associated with these delivery locations prior to arrival of the cargo vehicle at the next delivery stop.

Therefore, the system can autonomously retrieve multiple packages associated with multiple delivery locations prior to arrival of the cargo vehicle at a next delivery stop.

6. Identifying Packages

Blocks of the method S100 recite identifying a primary shelf, in the set of shelves 112, occupied by a primary package, in the set of packages, associated with the primary delivery location in Block S130. Generally, the system 100 can: access a shelf map representing geospatial locations and package characteristics of packages loaded onto the shelf assembly 110; and identify a shelf position of a package on the shelf assembly 110 based on the shelf map.

6.1 Non-Visual Package Identification

In one implementation, the system 100 can: as described above, access a delivery route assigned to the cargo vehicle and corresponding to the packages loaded onto the set of shelves 112; and access a shelf map-such as received from the remote computer system 100 prior to transit of the cargo vehicle and/or generated by the system 100 during a scan cycle during transit of the cargo vehicle-representing geospatial locations and package characteristics (e.g., weight, color, dimensions) of the set of packages loaded onto the set of shelves 112. The system 100 can then: retrieve a primary location of a primary package on the set of shelves 112 based on an upcoming destination along the delivery route and the shelf map; via the robotic arm 122, navigate the end effector 124 proximal the primary location on the set of shelves 112; trigger the end effector 124 to transiently retain (e.g., grip) the primary package at the primary location; and, via the robotic arm 122, navigate the end effector 124 to locate the primary package proximal the chute 116 (e.g., driver bay chute) in the cargo vehicle.

In one implementation, the system 100 can generate the shelf map during autonomous loading of packages onto the shelf assembly 110. For example, during a loading routine, the system 100 can: initialize shelf map representing the set of shelves 112; receive a package, such as at the retrieval area of the chute 116; autonomously load the package at a particular position on the set of shelves 112; and record the particular position of the package in the shelf map. In this example, the shelf map can further define visual characteristics (e.g., size, dimensions, color) and non-visual characteristics (e.g., weight, package contents)—such as recorded during the loading routine and/or recorded prior to loading (e.g., at the facility) the package at on the shelf assembly 110—for each package loaded at the set of shelves 112.

In another implementation, the system 100 can initialize a scan cycle to: traverse the optical sensor across the set of shelves and/or access image feeds of optical sensors mounted across the set of shelves 112; and leverage image data captured from the optical sensor in order to generate the shelf map.

Therefore, without relying on computer vision techniques, the system 100 can accurately and repeatably retrieve a package from the set of shelves 112 based on a known location of the package on the set of shelves 112.

6.2 Visual Package Identification

In one implementation, as described above, the system 100 includes an optical sensor 126 arranged at the end effector 124 and configured to capture images depicting the packages during navigation of the end effector 124 across the set of shelves 112. In this implementation, the system 100 can, implement computer vision techniques to: detect a previously-generated tag in an image captured by the optical sensor while previously traversing the shelf; extract an identifier from the tag; and, based on the identifier and the manifest of destinations, identify a particular position of the primary package on the shelf, contents within the primary package, dimensions of the primary package, color of the primary package prior to initiating retrieval and/or reordering of the primary package.

In one example, the system 100 can: extract a primary package identifier-corresponding to the primary package at the primary shelf—from the manifest of destinations; access an image, captured by the optical sensor 126, depicting a package at the primary location; detect a tag arranged on the package in a region of the image; extract a secondary package identifier corresponding to the package from the tag; and, in response to the primary package identifier matching the secondary package identifier, identify the package as the primary package in the manifest of destinations. The system can then: identify a shelf position on the shelf corresponding to the region of the image; and trigger the robotic arm to maneuver the end effector to the shelf position to transiently retain the primary package.

In another example, the system 100 can: extract a primary color identifier (e.g., red tape)—corresponding to the primary package at the primary shelf—from the manifest of destinations; access an image, captured by the optical sensor 126, depicting a package at the primary location; detect a color gradient across the package in a region of the image; extract a secondary color identifier corresponding to the package from the tag; and, in response to the primary color identifier matching the secondary color identifier, identify the package as the primary package in the manifest of destinations. The system can then: identify a shelf position on the shelf corresponding to the region of the image; and trigger the robotic arm to maneuver the end effector to the shelf position to transiently retain the primary package.

Therefore, the system 100 can accurately and repeatably locate a package arranged at the set of shelves 112 based on a tag arranged on the package within a field of view of the optical sensor 126.

6.3 Unique Indicium

In yet another example, the system 100 can leverage indicium (e.g., colors, tape, markings, rips, tears) arranged on the package to uniquely identify the package on a particular shelf in the event that a label on the package becomes obfuscated, such as from unintentional rearrangement (e.g., orientation, location) during emergency braking and/or sudden turns of the cargo vehicle. In this implementation, the system 100 can: detect absence of a label on a primary package during navigation of the end effector 124 across the set of shelves 112; and, based on differences between the shelf map and derived package characteristics (dimensions, color, weight) of the primary package, predict that the package corresponds to (or "is analogous to") a secondary package currently defined in the shelf map.

For example, the system 100 can access a shelf map representing, for each package—in the set of packages—arranged across the set of shelves 112: a package identifier of the package; a geospatial location of the package; a set of dimensions of the package; an orientation of the package; and a weight of the package. The system 100 can then: access a timeseries of images, captured by the optical sensor 126, during navigation of the end effector 124 by the robotic arm 122 across the primary shelf to the primary location; in a primary image, in the timeseries of images, detect absence of a tag arranged on a secondary package on the primary shelf; extract a primary set of visual features from the primary image; and generate a geospatial representation of the secondary package on the primary shelf based on the primary set of visual features.

Accordingly, the system 100 can then: based on the shelf map and the geospatial representation of the secondary package, —such as based on similarity of object dimensions, similarity of object colors, minimal planar displacement between the shelf map and the geospatial representation— predict a package identifier defined in the shelf map that corresponds to the secondary package; detect an indicium arranged on the secondary package in the primary image; link the indicium and the package identifier; and modify the shelf map to represent the geospatial representation of the secondary package and the indicium.

Therefore, the system 100 can accurately and repeatably locate a package arranged across the set of shelves 112 regardless of location of the package across the set of shelves 112 and obfuscation of a tag on the package.

6.4 Shelf Map Updates

In one implementation, the system 100 can access a primary shelf map representing, for each package in the set of packages, arranged on a primary shelf: an initial shelf position of the package arranged on the primary shelf; and an initial orientation of the package. Accordingly, during navigation of the cargo vehicle along a delivery route, the system 100 can: access a timeseries of images, captured by the optical sensor 126, while previously traversing the primary shelf; and extract a set of visual features from the timeseries of images. The system 100 can then, based on the set of visual features, generate a primary spatial representation of the primary shelf representing, for each package arranged on the primary shelf: a secondary shelf position of the package arranged on the primary shelf; and a secondary orientation of the package. The system 100 can then identify a difference between the primary shelf map and the primary spatial representation of the primary shelf; and update the primary shelf map based on the difference.

Therefore, the system 100 can routinely update the shelf map to maintain accurate and precise positions of packages arranged across the primary shelf in order to retrieve these packages during navigation of the cargo vehicle along the delivery route. The system 100 can then repeat this process across each shelf, in the set of shelves 112, to maintain accurate and precise positions of packages across the set of shelves 112.

7. Package Manipulation+Density Distribution

Blocks of the method S100 recite, during navigation of the cargo vehicle along the delivery route, in Block S140: triggering an elevator 121 to maneuver a robotic arm 122 to the primary shelf; triggering the robotic arm 122 to navigate an end effector 124, coupled to a distal end of the robotic arm 122, to the primary package on the primary shelf; triggering the end effector 124 to transiently retain the primary package; and triggering the robotic arm 122 to withdraw the primary package, via the end effector 124, toward a primary chute—configured to locate proximal a driver cab of the cargo vehicle—prior to arrival of the cargo vehicle at the primary delivery location in Block S150.

Generally, the system 100 can: via the robotic arm 122, navigate the end effector 124 proximal a primary location on the set of shelves 112; implement package identification techniques described above to verify a primary package to be queued for delivery along the delivery route of the cargo vehicle; trigger the end effector 124 to couple (or "vacuum grip") the primary package at the primary location; and, via the robotic arm 122, navigate the primary package to a secondary location proximal a chute 116 in preparation for dispensing the package through the chute 116 upon detecting arrival of the cargo vehicle at a target destination. More specifically, the system 100 can repeat these steps to distribute packages loaded onto the shelf assembly 110 in preparation for an predicted delivery destination along the delivery route of the cargo vehicle. Additionally, the system 100 can: distribute packages on the set of shelves according to a minimum stowing time for the set of packages; and/or distribute packages on the set of shelves according to a minimum retrieval time for the packages.

Furthermore, the system can implement path planning techniques to maneuver a package about other packages loaded on a shelf, such as by sliding (or "snaking" and/or lifting the package about the other packages loaded on the shelf. This can include rearranging other packages in order to remove a package without needing to lift it above the packages loaded on the same shelf, which can be desirable for tall packages.

Thus, rather than relying on an operator to manually locate and distribute packages within the cargo vehicle upon arriving at a delivery destination, the system 100 can autonomously queue packages for a corresponding destination along the delivery route while the cargo vehicle is in transit to the destination.

7.1 Chute Selection

In one implementation, the system 100 can select a chute 116, in a set of chutes, of the shelf assembly 110 to dispense the package based on derived package characteristics (e.g., weight, dimensions) of the package and known chute characteristics (e.g., chute dimensions) of the chute 116. More specifically, in this implementation, the system 100 can: designate light-weight (e.g., less than 10 pounds), smaller (e.g., 1 feet×1.5 feet), packages to a primary chute 116 arranged proximal the driver cab in the cargo vehicle; and designate heavier (e.g., greater than 10 pounds), larger (e.g., greater than 2 feet×3 feet), high-handling risk (e.g., hazmat, flammable combustible) packages to a secondary chute 117 arranged proximal rear doors (or side doors) of the cargo vehicle.

In one example, the system 100 can: extract a primary weight of a primary package arranged on the set of shelves 112 from the manifest of destinations; and, in response to the primary weight less than a threshold weight (e.g., 10 pounds), designate the primary package to the primary chute 116 arranged proximal the driver cab of the cargo vehicle. Additionally, the system 100 can: extract a secondary weight of a secondary package arranged on the set of shelves 112 from the manifest of destinations; and, in response to the secondary weight of the secondary package exceeding the threshold weight, designate the primary package to the secondary chute 117 arranged proximal the rear doors of the cargo vehicle.

In another example, the system 100 can include a primary chute 116 arranged proximal the driver cab of the cargo vehicle characterized by a primary set of chute dimensions. In this example, during transit of the cargo vehicle along the delivery route, the system 100 can: access a primary image, captured by the optical sensor 126, depicting the primary package at the primary location; extract a primary set of visual features from the primary image; derive a primary set of package dimensions of the primary package based on the primary set of visual features; and, in response to the primary set of package dimensions falling below the primary set of chute dimensions, via the robotic arm 122, navigate the end effector 124 to locate the primary package at the secondary location proximal the primary chute 116.

In another example, the system 100 can include a secondary chute 117 arranged proximal a rear door of the cargo vehicle and characterized by a secondary set of chute dimensions greater than the primary set of chute dimensions. In this example, during transit of the cargo vehicle along the delivery route, the system 100 can: retrieve a primary location of a secondary package-corresponding to the primary destination of the delivery route-arranged on a secondary shelf, in the set of shelves 112, based on the manifest of destinations; via the robotic arm 122, navigate the end effector 124 proximal the primary location at the secondary shelf; and access a secondary image, captured by the optical sensor 126, depicting the secondary package at the primary location. The system 100 can then: extract a secondary set of visual features from the secondary image; derive a secondary set of package dimensions of the secondary package based on the secondary set of visual features; trigger the end effector 124 to transiently retain the secondary package; and, in response to the secondary set of package dimensions exceeding the primary set of chute dimensions of the primary chute 116, via the robotic arm 122, navigate the end effector 124 to locate the secondary package at a secondary location proximal the secondary chute 117.

Therefore, in response to detecting the cargo vehicle at the primary destination, the system 100 can: via the robotic arm 122, navigate the end effector 124 to locate the secondary package coaxial with the secondary chute 117; and trigger the end effector 124 to dispense the secondary package through the secondary chute 117 arranged proximal the rear door of the cargo vehicle.

Therefore, the system 100 can minimize risk exposure of an operator carrying a heavy and/or hazardous package by selectively designating a chute 116 for dispensing the package.

7.2 Dragging vs. Lifting

In one implementation, the system 100 can selectively: via the robotic arm 122 and the end effector 124, drag a package across a shelf to locate the package proximal the chute 116 of the shelf assembly 110; and/or, via the robotic arm 122 and the end effector 124, lift the package over the shelf to locate the package proximal the chute 116 of the shelf assembly 110. In this implementation, the system 100 can selectively drag the package instead of lifting the package based on: dimensions of the package at the shelf exceeding threshold dimensions; available height of the partition falling below a threshold height; weight of the package exceeding a threshold weight; and/or exposure to high-risk contents (e.g., hazmat, flammable materials, combustible materials) of the package.

In one example, the end effector 124 includes: a set of suction pads 125 coupled to a vacuum pump configured to draw a vacuum to transiently retain packages arranged on the set of shelves 112 to the end effector 124; and a load cell 128 coupled to the robotic arm 122 configured to output a signal representing a load carried by the end effector 124. In this example, the system 100 can then: read a timeseries of load values from the load cell 128; trigger the vacuum pump to transiently retain the primary package at the primary location to the end effector 124; derive a primary weight of the primary package based on the timeseries of load values; and, in response to the primary weight falling below a target threshold weight—via the robotic arm 122—navigate the end effector 124 to locate the primary package proximal the primary chute 116 by lifting the primary package from the primary location on the primary shelf.

In another example, the shelf includes a set of ball transfers 113 arranged across a surface of the shelf. In this example, the system 100 can: read a timeseries of load values from the load cell 128; trigger the vacuum pump to transiently retain the primary package at the primary location to the end effector 124; derive a primary weight of the primary package based on the timeseries of load values; and, in response to the primary weight exceeding a target threshold weight—via the robotic arm 122—navigate the end effector 124 to locate the primary package proximal the primary chute 116 by dragging the primary package across the set of ball transfers 113 of the primary shelf. In this example, other variations of the system can implement linear rollers or a pressurized air distribution system to distribute pressurized air across the surface of the shelf to aid in dragging packages across the shelf.

In another implementation, the system 100 can selectively drag or lift the package based on: extension of the robotic arm 122 to retrieve the package; and/or based on available area on the package accessible to the set of suction pads 125.

For example, the system 100 can: detect the robotic arm 122 in a fully extended position to retrieve a package; in response to the robotic arm 122 in the fully extended position, trigger the vacuum pump to generate a vacuum at the set of suction pads 125 to transiently retain the package; and trigger the robotic arm to drag the package, toward the chute 116, while retracting the robotic arm 122 to reduce bending force on the robotic arm. In this example, the system 100 can then transition to lifting the package, via the robotic arm 122, upon retracting the robotic arm 122.

In another example, the system 100 can: based on retrieved dimensions of the package, identify a graspable area of the package as less than a threshold graspable area of the set of suction pads 125. Accordingly, the system can then: trigger the vacuum pump to generate a vacuum at one or more suction pads corresponding to the graspable area of the package; and trigger the robotic arm to drag the package across the shelf to compensate for the reduced graspable area of the package.

7.3 Hazardous Driving Conditions

In another implementation, the system 100 can: include a suite of accelerometers and/or vibration sensors coupled to the shelf assembly 110; read vibration signals from these vibration sensors during transit of the cargo vehicle along the delivery route; and detect anomalous driving conditions (e.g., emergency braking, uneven roads) based on the vibration signals. Accordingly, during these anomalous driving conditions, the system 100 can pause manipulation of packages across the set of shelves 112 until nominal driving conditions are detected. Alternatively, the system 100 can select to maneuver these packages based on a combination of factors, such as the driving conditions detected, available area on the package accessible to the set of suction pads 125, weight of the package, and/or a material (e.g., porous material) of the package. For example, the system 100 can:

identify a weight of a package as exceeding a threshold weight; and identify available area on the package accessible to the set of suction pads 125 as falling below a threshold area (e.g., 1 foot by 1 foot). Accordingly, in response to these conditions, the system 100 can defer retrieval of the package until nominal driving conditions are detected at the cargo vehicle and/or until the cargo vehicle arrives at the next destination.

8. Package Pick-Up

In one implementation, the system 100 can receive packages for loading at a destination along the delivery route of the cargo vehicle. In this implementation, the system 100 can implement techniques and methods described above to: confirm receipt of the pick-up package; in response to package characteristics of the pick-up package deviating from target package characteristics, generate a prompt requesting an operator to refuse receipt of the package; and serve this prompt to an operator such as at a display device integrated into the driver cab of the cargo vehicle.

For example, during transit of the cargo vehicle along the delivery route, the system 100 can: access a secondary manifest of destinations associated with packages for pick-up along the delivery route; based on the secondary manifest of destinations, retrieve a target identifier associated with a secondary package scheduled for pick-up at the primary destination; and generate a prompt requesting an operator to load the secondary package into the primary chute 116. The system 100 can then: in response to detecting the cargo vehicle at the primary destination, serve the prompt to the operator; access a primary image, captured by the optical sensor 126, depicting a field of view intersecting the primary chute 116; detect a tag (e.g., barcode, QR code) in the primary image; read a primary identifier from the tag; and, in response to the primary identifier corresponding to the target identifier, confirm receipt of the secondary package at the primary chute 116.

In another example, prior to transit of the cargo vehicle along the delivery route following the primary destination, the system 100 can: extract a primary set of visual features from the primary image; derive a set of package dimensions for the secondary package based on the primary set of visual features; read a primary timeseries of load values from the load cell 128; trigger the end effector 124 to transiently retain the secondary package at the primary chute 116; and derive a weight of the secondary package based on the primary timeseries of load values. Accordingly, in response to the set of dimensions and the weight of the secondary package exceeding a threshold deviation from a target set of dimensions and a target weight associated with the identifier of the secondary package, the system 100 can: generate a prompt requesting the operator to refuse pick-up of the secondary package; and serve the prompt to the operator.

Therefore, the system 100 can reduce exposure to: fraudulent package returns during receipt of outgoing packages at the system 100; and reduce exposure of the operator to potentially hazardous (e.g., hazmat, flammable, combustible) packages.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
   a self-contained module configured to be installed within a cargo vehicle, the self-contained module comprising:
   a shelf assembly:
   comprising a set of shelves configured to store a set of packages; and
   wherein a first chute extends vertically through an opening of multiple shelves of the set of shelves, the first chute is located proximal a driver cab of the cargo vehicle; and
   a robotic assembly comprising:
   an end effector configured to transiently retain packages, in the set of packages, stored on the set of shelves;
   a robotic arm configured to manipulate the end effector across the set of shelves to transiently withdraw individual packages, in the set of packages, from the set of shelves toward the first chute; and
   an elevator configured to maneuver the robotic arm between the set of shelves; and
   a controller configured to:
   access a manifest of destinations assigned to the set of packages;
   during navigation of the cargo vehicle along a delivery route:
   access a first geospatial location of the cargo vehicle;
   predict a first delivery location, in the delivery route, based on the first geospatial location and the manifest of destinations;
   identify a first shelf, in the set of shelves, occupied by a first package, in the set of packages, associated with the first delivery location;
   trigger the elevator to maneuver the robotic arm to the first shelf;
   trigger the robotic arm to navigate the end effector to the first package on the first shelf;
   trigger the end effector to transiently retain the first package; and
   trigger the robotic arm to withdraw the first package, via the end effector, toward the first chute prior to arrival of the cargo vehicle at the first delivery location.

2. The system of claim 1, wherein the controller is configured to:
   access a first shelf map representing previously known positions of a subset of packages, in the set of packages, arranged on the first shelf;

during navigation of the cargo vehicle along a delivery route:
  identify a first shelf position of the first package on the first shelf based on the first shelf map; and
  trigger the robotic arm to navigate the end effector to the first shelf position on the first shelf to transiently retain the first package.

3. The system of claim 1:
wherein the robotic assembly further comprises an optical sensor:
  arranged on the robotic arm; and
  configured to capture images depicting packages, in the set of packages, stored on the set of shelves during navigation of the robotic arm across the set of shelves; and
wherein the controller is configured to, during navigation of the cargo vehicle along the delivery route:
  extract a first package identifier of the first package from the manifest of destinations;
  access a first image captured by the optical sensor while previously traversing the first shelf;
  detect a tag, comprising the first package identifier, in a first region of the first image;
  identify a first shelf position of the first package, corresponding to the first region of the first image, on the first shelf; and
  trigger the robotic arm to navigate the end effector to the first shelf position on the first shelf to transiently retain the first package.

4. The system of claim 1:
wherein the robotic assembly further comprises:
  an optical sensor:
    arranged on the robotic arm; and
    configured to capture images depicting packages, in the set of packages, stored on the set of shelves during navigation of the robotic arm across the set of shelves; and
  a load cell coupled to the robotic arm and configured to output a signal representing a load carried by the end effector; and
wherein the controller is configured to, during navigation of the cargo vehicle along the delivery route:
  retrieve a first recorded set of visual characteristics of the first package;
  extract a first stored weight of the first package from the manifest of destinations;
  access a first image captured by the optical sensor while previously traversing the first shelf;
  detect the first package in a first region of the first image based on the first recorded set of visual characteristics;
  identify a first shelf position of the first package, corresponding to the region of the first image, on the first shelf;
  trigger the robotic arm to navigate the end effector to the first shelf position on the first shelf to transiently retain the first package;
  read a first weight of the first package from the load cell; and
  in response to the first weight falling within a threshold difference of the first stored weight:
    confirm retrieval of the first package associated with the first delivery location; and
    trigger the robotic arm to withdraw the first package, via the end effector, toward the first chute prior to arrival of the cargo vehicle at the first delivery location.

5. The system of claim 1:
wherein the shelf assembly further defines a second chute extending vertically between the set of shelves and configured to locate proximal rear doors of the cargo vehicle; and
wherein the controller is configured to, during navigation of the cargo vehicle along the delivery route:
  extract a first weight of the first package from the manifest of destinations;
  in response to the first weight less than a threshold weight, trigger the robotic arm to withdraw the first package, via the end effector, toward the first chute prior to arrival of the cargo vehicle at the first delivery location;
  identify a second shelf, in the set of shelves, occupied by a second package, in the set of packages, associated with the first delivery location;
  extract a second weight of the second package from the manifest of destinations;
  trigger the elevator to maneuver the robotic arm to the second shelf;
  trigger the robotic arm to navigate the end effector to the second package on the second shelf;
  trigger the end effector to transiently retain the second package; and
  in response to the second weight greater than the threshold weight, trigger the robotic arm to withdraw the second package, via the end effector, toward the second chute following arrival of the cargo vehicle at the first delivery location.

6. The system of claim 1:
wherein the set of shelves comprises:
  a first shelf defining a first rectilinear geometry; and
  a second shelf:
    defining a second rectilinear geometry; and
    arranged over the first shelf;
wherein the shelf assembly further comprises:
  a set of vertical supports configured to:
    support corners of the first shelf; and
    support corners of the second shelf above the first shelf; and
  an actuator:
    coupled to the second shelf; and
    configured to drive the second shelf over a range of heights above the first shelf; and
wherein the controller is configured to, prior to navigating the end effector to the first package on the first shelf:
  in response to identifying the first shelf, in the set of shelves, occupied by the first package:
    trigger the actuator to raise the second shelf to increase clearance for the robotic arm to withdraw the first package, via the end effector, toward the first chute by lifting the first package over a first subset of packages, in the set of packages, arranged on the first shelf.

7. The system of claim 1:
wherein the set of shelves comprises:
  the first shelf comprising a first aperture arranged at a first side of the first shelf proximal the driver cab of the cargo vehicle; and
  a second shelf:
    arranged below the first shelf; and
    comprising a second aperture:
      arranged at a second side, adjacent the first side, of the second shelf proximal the driver cab of the cargo vehicle; and coaxial with the first aperture to form the first chute;

wherein the controller is configured to:
during navigation of the cargo vehicle along the delivery route:
trigger the robotic arm to withdraw the first package, via the end effector, to a first shelf position proximal the first aperture on the first shelf prior to arrival of the cargo vehicle at the first delivery location; and
in response to detecting the cargo vehicle at the first delivery location:
trigger the robotic arm to navigate the end effector to the first shelf position on the first shelf to transiently retain the first package;
trigger the robotic arm to locate the first package, via the end effector, coaxial with the first aperture of the first shelf; and
trigger the elevator to maneuver the robotic arm, the end effector, and the first package through the first aperture and the second aperture toward an outlet of the first chute.

8. The system of claim 1:
wherein the robotic assembly further comprises a longitudinal conveyor:
coupled to the elevator; and
configured to traverse the robotic arm longitudinally along the set of shelves;
wherein the elevator:
is arranged on a lateral side of the set of shelves; and
configured to traverse the robotic arm and longitudinal conveyor vertically between the set of shelves;
wherein the robotic arm:
is cantilevered on the longitudinal conveyor; and
configured to extend laterally across the set of shelves; and
wherein the controller is configured to:
based on the manifest of destinations, select a first three-dimensional coordinate position of the first package arranged on the first shelf, the first three-dimensional coordinate position defining:
a first height corresponding to the first shelf in the set of shelves;
a first length along the first shelf; and
a first width into the first shelf; and
during transit of the cargo vehicle along the delivery route:
trigger the elevator to maneuver the robotic arm to the first height corresponding to the first shelf;
trigger the longitudinal conveyor to traverse the robotic arm to the first length along the first shelf; and
trigger the robotic arm to extend laterally according to the first width to locate the end effector at the first three-dimensional coordinate position of the first package.

9. The system of claim 8:
wherein the first chute is arranged at a first corner of the set of shelves;
wherein the controller is configured to, during navigation of the cargo vehicle along the delivery route:
identify a second shelf, in the set of shelves, occupied by a second package, in the set of packages, associated with the first delivery location;
based on the manifest of destinations, select a second three-dimensional coordinate position of the second package arranged on the second shelf, the second three-dimensional coordinate position defining:
a second height corresponding to the second shelf in the set of shelves;
a second length along the second shelf; and
a second width into the second shelf; and
following withdrawal of the first package on the first shelf, trigger the longitudinal conveyor to traverse the robotic arm to intersect the first chute at the first corner of the set of shelves;
trigger the robotic arm to retract laterally to locate the end effector coaxial with the first chute;
trigger the elevator to maneuver the robotic arm, through the first chute, to the second height corresponding to the second shelf;
trigger the longitudinal conveyor to traverse the robotic arm to the second length along the second shelf;
trigger the robotic arm to extend laterally according to the second width to locate the end effector at the second three-dimensional coordinate position of the second package on the second shelf;
trigger the end effector to retain the second package at the second three-dimensional position; and
trigger the robotic arm to withdraw the second package, via the end effector, toward the first chute prior to arrival of the cargo vehicle at the first delivery location.

10. The system of claim 1:
wherein the end effector comprises a set of suction pads;
further comprising a vacuum pump coupled to the set of suction pads and configured to generate negative pressure at the set of suction pads to transiently retain individual packages, in the set of packages, to the end effector; and
wherein the controller is configured to, during navigation of the cargo vehicle along a delivery route:
extract a first weight of the first package from the manifest of destinations;
trigger the vacuum pump to draw a vacuum at the set of suction pads to transiently retain the first package to the end effector; and
in response to the first weight of the first package less than a target threshold weight:
trigger the robotic arm to withdraw the first package, via the end effector, toward the first chute by lifting the first package over a first subset of packages, in the set of packages, arranged on the first shelf.

11. The system of claim 10:
wherein the set of shelves comprises:
a bottom shelf:
arranged across a floor of the cargo vehicle;
defining a rectilinear geometry; and
comprising a set of ball transfers arranged across a surface of the bottom shelf; and
wherein the controller is configured to, during navigation of the cargo vehicle along a delivery route:
identify the bottom shelf, in the set of shelves, occupied by a second package, in the set of packages, associated with the first delivery location;
extract a second weight of the second package from the manifest of destinations;
trigger the elevator to maneuver the robotic arm to the bottom shelf;
trigger the robotic arm to navigate the end effector to the second package on the bottom shelf;

trigger the vacuum pump to draw a vacuum at the set of suction pads to transiently retain the second package to the end effector; and
in response to the second weight of the second package greater than the target threshold weight:
trigger the robotic arm to withdraw the second package, via the end effector, toward the first chute by dragging the second package, across the set of ball transfers, about a second subset of packages, in the set of packages, arranged on the bottom shelf.

12. The system of claim 1:
wherein the robotic assembly further comprises an optical sensor:
arranged on the robotic arm; and
configured to capture images depicting packages, in the set of packages, stored on the set of shelves during navigation of the robotic arm across the set of shelves; and
wherein the controller is configured to:
access a first shelf map representing initial shelf positions of packages arranged on the first shelf;
at a first time during navigation of the cargo vehicle along a delivery route:
access a set of images captured by the optical sensor while traversing the first shelf;
extract a set of visual features from the set of images;
based on the set of visual features, update the first shelf map to represent shelf positions of packages arranged on the first shelf at a second time following the first time; and
extract a first shelf position of the first package arranged on the first shelf from the updated first shelf map; and
trigger the robotic arm to navigate the end effector to the first shelf position on the first shelf to transiently retain the first package.

13. The system of claim 1, wherein the controller is configured to, during navigation of the cargo vehicle along a delivery route:
extract a second delivery location of a second package arranged on the first shelf from the manifest of destinations;
based on the first geospatial location and the first delivery location of the first package, calculate a first confidence score representing that a next destination of the cargo vehicle corresponds to the first delivery location of the first package; and
based on the first geospatial location and the second delivery location of the second package, calculate a second confidence score representing that the next destination of the cargo vehicle corresponds to the second delivery location of the second package; and
in response to the first confidence score and the second confidence score exceeding confidence scores of a first subset of packages, in the set of packages, arranged on the first shelf:
trigger the robotic arm to withdraw the first package, via the end effector, adjacent the first chute prior to arrival of the cargo vehicle at the next delivery location; and
trigger the robotic arm to withdraw the second package, via the end effector, adjacent the first chute and the first package prior to arrival of the cargo vehicle at the next delivery location.

14. The system of claim 13, wherein the controller is configured to, in response to detecting the cargo vehicle at the next delivery location:
trigger the robotic arm to withdraw the first package, via the end effector, coaxial with the first chute; and
trigger the elevator to maneuver the robotic arm, the end effector, and the first package towards an outlet of the first chute;
trigger the end effector to release the first package at the outlet of the first chute;
following release of the first package, trigger the elevator to maneuver the robotic arm to the first shelf;
trigger the robotic arm to withdraw the second package, via the end effector, coaxial with the first chute;
trigger the elevator to maneuver the robotic arm, the end effector, and the second package towards an outlet of the first chute; and
trigger the end effector to release the second package at the outlet of the first chute.

15. The system of claim 13, wherein the controller is configured to, during navigation of the cargo vehicle along the delivery route:
for each package arranged on the first shelf:
extract a delivery location of the package from the manifest of destinations;
based on the first geospatial location of the cargo vehicle and the delivery location of the package, calculate a confidence score representing that a next destination of the cargo vehicle corresponds to the delivery location of the package; and
trigger the robotic arm to locate the package, via the end effector, at a shelf position across the first shelf inversely proportional to the confidence score prior to arrival of the cargo vehicle at the next delivery location.

16. A method comprising, at a self-contained storage and distribution module configured to install within a cargo vehicle:
accessing a manifest of destinations assigned to a set of packages, pre-loaded onto a set of shelves, for delivery along a delivery route of the cargo vehicle;
during navigation of the cargo vehicle along the delivery route:
accessing a first geospatial location of the cargo vehicle;
predicting a first delivery location, in the delivery route, based on the first geospatial location and the manifest of destinations;
identifying a first shelf, in the set of shelves, occupied by a first package, in the set of packages, associated with the first delivery location;
triggering an elevator to maneuver a robotic arm to the first shelf;
triggering the robotic arm to navigate an end effector, coupled to a distal end of the robotic arm, to the first package on the first shelf;
triggering the end effector to transiently retain the first package; and
triggering the robotic arm to withdraw the first package, via the end effector, toward a first chute, configured to be located proximal a driver cab of the cargo vehicle, prior to arrival of the cargo vehicle at the first delivery location.

17. The method of claim 16:
further comprising, extracting a first weight of the first package from the manifest of destinations;

wherein triggering the robotic arm to withdraw the first package, via the end effector, toward the first chute comprises, in response to the first weight less than a threshold weight, triggering the robotic arm to withdraw the first package, via the end effector, toward the first chute prior to arrival of the cargo vehicle at the first delivery location;

further comprising, during navigation of the cargo vehicle along the delivery route:
- identifying a second shelf, in the set of shelves, occupied by a second package, in the set of packages, associated with the first delivery location;
- extracting a second weight of the second package from the manifest of destinations;
- triggering the elevator to maneuver the robotic arm to the second shelf;
- triggering the robotic arm to navigate the end effector to the second package on the second shelf;
- triggering the end effector to transiently retain the second package; and
- in response to the second weight greater than the threshold weight, triggering the robotic arm to withdraw the second package, via the end effector, toward a second chute, configured to locate proximal rear doors of the cargo vehicle, following arrival of the cargo vehicle at the first delivery location.

18. The method of claim 16:
further comprising, during navigation of the cargo vehicle along the delivery route, extracting a first weight of the first package from the manifest of destinations;
wherein triggering the end effector to transiently retain the first package comprises triggering a vacuum pump to draw a vacuum at a set of suction pads, arranged on the end effector, to transiently retain the first package to the end effector; and
wherein triggering the robotic arm to withdraw the first package, via the end effector, toward the first chute comprises, in response to the first weight less than a threshold weight:
- triggering the robotic arm to withdraw the first package, via the end effector, toward the first chute by lifting the first package over a first subset of packages, in the set of packages, arranged on the first shelf.

19. The method of claim 18, further comprising, during navigation of the cargo vehicle along the delivery route:
- identifying a bottom shelf, in the set of shelves, occupied by a second package, in the set of packages, associated with the first delivery location;
- extracting a second weight of the second package from the manifest of destinations;
- triggering the elevator to maneuver the robotic arm to the bottom shelf;
- triggering the robotic arm to navigate the end effector to the second package on the bottom shelf;
- triggering the vacuum pump to draw a vacuum at the set of suction pads to transiently retain the second package to the end effector; and
- in response to the second weight of the second package greater than the target threshold weight:
  - triggering the robotic arm to withdraw the second package, via the end effector, toward the first chute by dragging the second package, across a set of ball transfers arranged across the bottom shelf, about a second subset of packages, in the set of packages, arranged on the bottom shelf.

20. A system comprising:
a self-contained module configured to be installed within a cargo vehicle, the self-contained module comprising:
  a shelf assembly:
    comprising a set of shelves configured to store a set of packages; and
    wherein a first chute extends vertically through an opening of multiple shelves of the set of shelves, the first chute is located proximal a driver cab of the cargo vehicle; and
  a robotic assembly comprising:
    an end effector configured to transiently retain packages, in the set of packages, stored on the set of shelves;
    a robotic arm configured to manipulate the end effector across the set of shelves to transiently withdraw individual packages, in the set of packages, from the set of shelves toward the first chute; and
    an elevator configured to maneuver the robotic arm between the set of shelves; and
a controller configured to:
  access a manifest of destinations assigned to the set of packages;
  access a first geospatial location of the cargo vehicle;
  predict a first delivery location, in the delivery route, based on the first geospatial location and the manifest of destinations;
  identify a first shelf, in the set of shelves, occupied by a first package, in the set of packages, associated with the first delivery location;
  trigger the elevator to maneuver the robotic arm to the first shelf;
  trigger the robotic arm to navigate the end effector to the first package on the first shelf;
  trigger the end effector to transiently retain the first package; and
  trigger the robotic arm to withdraw the first package, via the end effector, toward the first chute prior to arrival of the cargo vehicle at the first delivery location.

* * * * *